May 9, 1933. B. P. SCHILTZ 1,907,447
FLEXIBLE DRIVING CONNECTION
Filed March 24, 1930  2 Sheets-Sheet 1
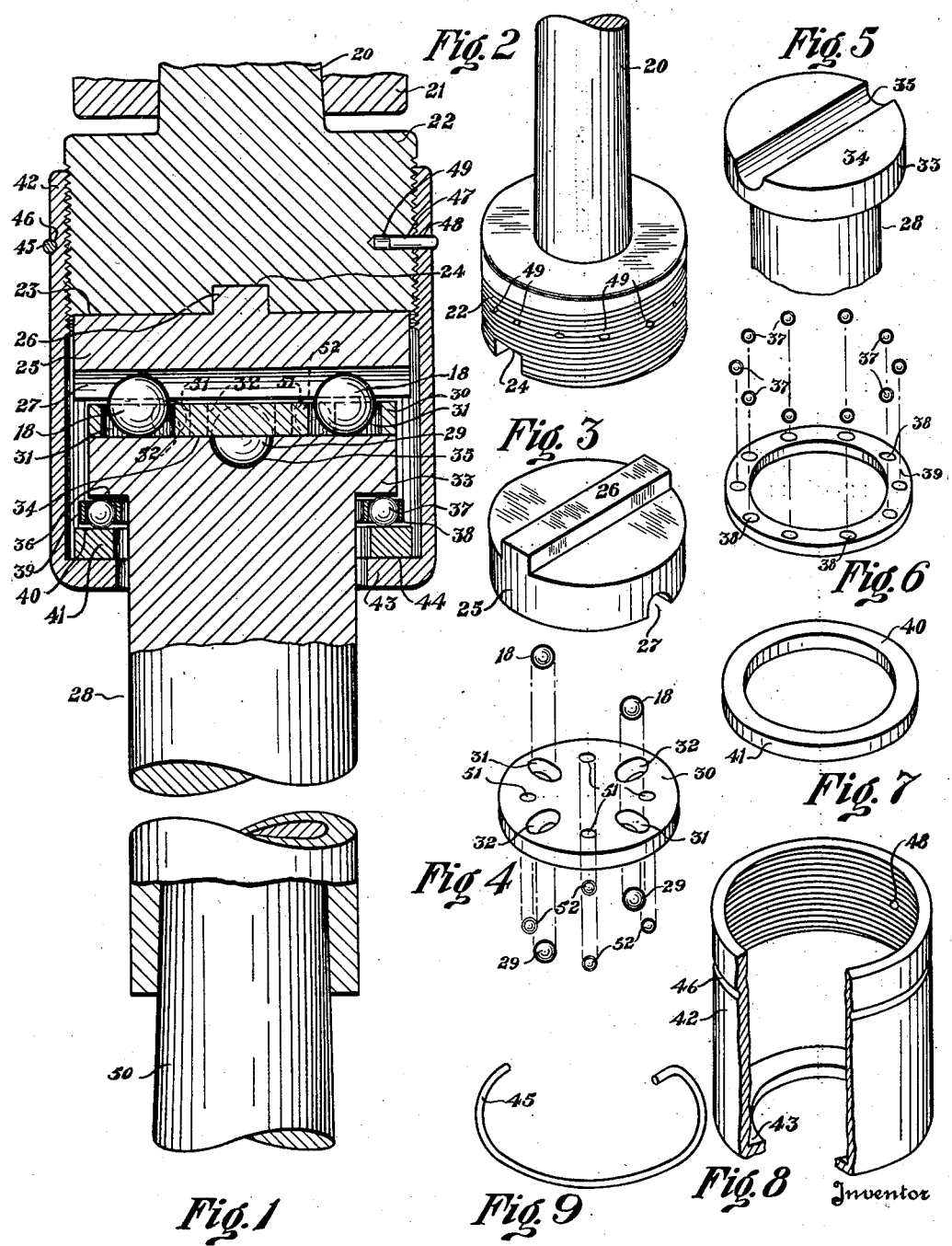
Inventor
Bernard P. Schiltz
By Frease and Bishop
Attorneys

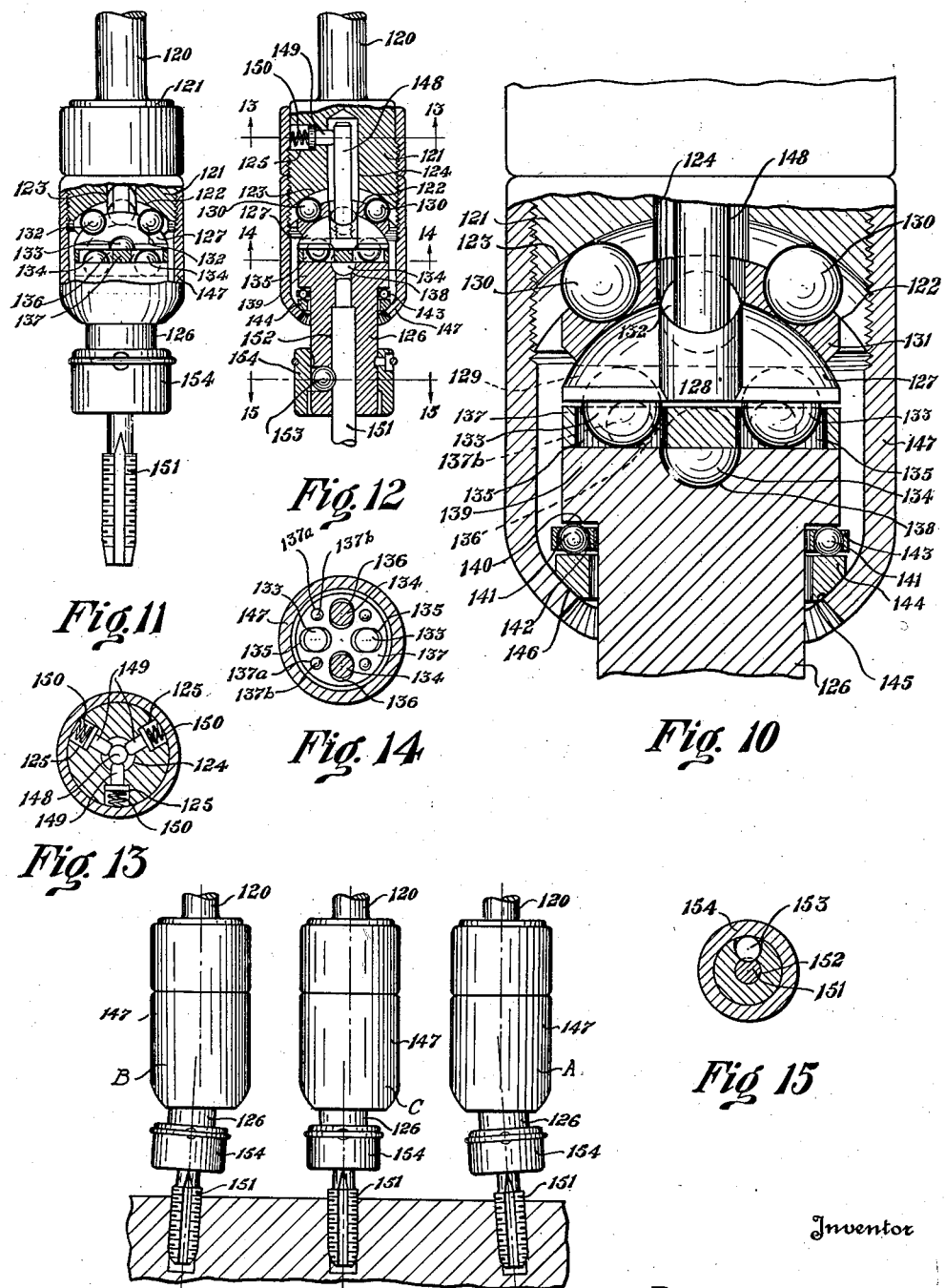

Patented May 9, 1933

1,907,447

UNITED STATES PATENT OFFICE

BERNARD P. SCHILTZ, OF CLEVELAND, OHIO

FLEXIBLE DRIVING CONNECTION

Application filed March 24, 1930. Serial No. 438,319.

The invention relates to flexible driving connections for tool holders for drills, taps, reamers and the like; and the present invention is an improvement upon the device shown in my copending application entitled Flexible driving connection, filed April 27, 1926, Serial No. 104,902, matured in Patent No. 1,782,633, dated November 25, 1930.

It is desirable, if not necessary, that taps, drills, reamers and the like be afforded a considerable range of leeway, in carrying out the tapping, reaming or drilling operation, in order to accommodate the same for inaccuracies in press set-ups or misalignments and center line angularities of previously drilled holes. Such flexibility has been provided for in the construction shown in my prior application, above identified, which is known as a full-floating type tool holder. The full-floating tool holder permits the tool to have both a lateral and an angular axial displacement during operation.

Often it is necessary only to provide for a lateral displacement of the tool during operation. This is accomplished by a device known as a semi-floating type tool holder, an improved design of which is shown herein and forms part of the present invention.

It has been found that flexible tool holders of both the semi-floating and full-floating types are subject to great wear between the contacting housing and tool holder surfaces, due to the constant sliding occurring between the surfaces during operation of the tool as the tool whips or shifts laterally or laterally and angularly to and fro.

An object of the present invention is therefore to provide a semi-floating or a full-floating tool holder which includes an anti-friction device for relieving the tool holder from wear between its casing and tool bit surface; the anti-friction device also permitting a lateral or an angular and lateral displacement of the tool during operation.

Another object of the invention is to provide an anti-friction device which carries the thrust loading set up during operation of the tool as the same whips back and forth, because of the inaccuracies in alignment between tool holder and work which causes a bending of the tool and holder resulting in thrust between the housing and tool holder surfaces.

A further object of the invention is to provide for the desired flexibility and yet avoid loose connections or lost motion in the driving connection; and to provide a driving connection adapted for use by the average mechanic.

And finally, an object of the present invention is to provide compact semi-floating or full-floating tool holder driving connections whose constituent elements are of simple design and inexpensive in cost.

These and other objects may be attained by providing constructions, preferred embodiments of which are hereinafter set forth in detail, and which may be stated in general terms as including a power drive member, a tool holder, means coacting between the drive member and tool holder for transferring rotary motion from the drive member to the tool holder while permitting lateral or angular and lateral movement of the tool holder relative to the drive member, means for maintaining the drive member, tool member, and coacting means in cooperative relation, and anti-friction means for carrying the thrust between the tool holder and the last mentioned means.

Preferred embodiments of the improved constructions are shown in the accompanying drawings in which;

Figure 1 is a longitudinal sectional view of the improved semi-floating flexible driving connection;

Fig. 2 is a perspective view of a portion of the power drive shank showing its integral threaded block;

Fig. 3 is a perspective view of the driver key member;

Fig. 4 is a perspective view of the drive ball retainer with its drive and thrust balls shown in expanded relation;

Fig. 5 is a fragmentary perspective view of the upper end of the tool holder;

Fig. 6 is a perspective view of the thrust ball retainer showing its thrust balls in expanded relation;

Fig. 7 is a perspective view of the hardened raceway ring;

Fig. 8 is a perspective view, partially broken away in section, of the housing sleeve;

Fig. 9 is a perspective view of the locking spring for the housing sleeve;

Fig. 10 is a fragmentary elevation, partially in longitudinal section, showing the improved full-floating flexible driving connection;

Fig. 11 is an elevation of the full-floating driving connection, broken away midway in section;

Fig. 12 is a longitudinal sectional view similar to Fig. 10, of the improved full-floating flexible driving connection;

Fig. 13 is a transverse section on the line 13—13, Fig. 12;

Fig. 14 is another section on the line 14—14, Fig. 12;

Fig. 15 is another section through the chuck on the line 15—15, Fig. 12; and

Fig. 16 is a fragmentary view of a multiple spindle tapping mechanism employng three full-floating driving connections showing, in an exaggerated fashion, the various capacities for adaptation to the conditions of the work being operated upon.

Similar numerals refer to corresponding parts throughout the various figures of the drawings.

The improved semi-floating driving connection includes a power drive shank 20 which may be connected in any suitable manner with the rotatably driven member 21 of any suitable machine tool. This shank includes a preferably integral threaded cylindric block 22 having a lower plane end surface 23 provided with a diametrical keyway 24.

A driver key member 25, having an integral diametrical key 26 extending upward from its upper plane surface for engagement in the key slot 24, is provided with a semi-cylindrical diametrical groove 27 in its under plane surface, disposed preferably at right angles to the integral key 26.

Coacting means is provided for transmitting a power drive from the shank 20 to the tool holder indicated generally at 28, and includes upper drive balls 18, lower drive balls 29 and a drive ball retainer disk 30.

The drive ball retainer 30 is provided with radially disposed elongated through openings 31 in which are located the drive balls 18, and radially disposed elongated through openings 32, positioned at right angles with respect to the openings 31, in which are located the drive balls 29.

The tool holder 28 has an integral flanged disk 33, in the upper plane surface 34 of which is provided a semi-cylindrical diametrical groove 35. The under annular surface 36, of the disk 33, cooperates with thrust balls 37 maintained in spaced relation in the through openings 38, provided in the thrust ball retainer ring 39; and the balls 37 run on the upper surface 40 of the hardened raceway ring 41.

The various parts are maintained in assembled relation, as shown in Fig. 1, by the internally threaded housing sleeve 42 whose inwardly extending flange 43, engages the under surface 44, of the hardened ring 41, when it is secured in threaded engagement with the threaded block 22 of the power drive shank 20. The threaded engagement between the members 22 and 42 may be maintained at any desired fixed position by the locking spring 45 engaging the annular groove 46, in the outer surface of the member 42 and having an inwardly directed projection 47 engageable through the opening 48 with any one of a number of radial openings 49, in the threaded block 22.

Any suitable tool 50 such as a drill, tap, reamer or the like may have its shank carried in the usual manner by the tool holder 28, as shown in Fig. 1.

Rotary movement is transmitted from the shank 20 to the driver key member 25, through its keyed connection 24—26 with the block 22; to the drive ball retainer 30 through the medium of the groove 27, elongated openings 31 and cooperating drive balls 18; to the tool holder 28 through the medium of the elongated openings 32, the groove 35 and cooperating drive balls 29; and thence to the tool 50 which is carried by the tool holder 28.

The drive ball retainer disk 30 is provided with a series of through openings 51, best shown in Fig. 4, in which are located a series of thrust rolling members such as balls 52, which contact with the under surface of the driver key member 25, and the upper plane surface 34 of the tool holder 28 for carrying the thrust loading due to the pressure exerted for forcing the rotating tool 50 downward into the work. This construction substantially relieves the drive balls 18 and 29 from any thrust loading so that they only operate to transfer rotary motion from the rotatable shank 20 through the medium of the drive ball retainer disk 30, to the tool 50.

The elongated through openings 31 permit the drive balls 18 to roll lengthwise of the semi-cylindical diametrical groove 27, and the elongated through openings 32 likewise permit the drive balls 29 to roll lengthwise of the semi-cylindrical diametrical groove 35; thus permitting the tool holder 28 and tool 50 carried thereby to rotate with its axis offset in relation to the axis of the power drive shank 20, in order to accommodate for a misalignment of the work, with the axis of the power drive.

Moreover, the axis of the work in being laterally offset with respect to the axis of the tool, causes a bending of the tool and tool holder as the same shift to and fro, which bending is resisted by the thrust balls 37 rolling between the surfaces 36 and 40. It has been found that semi-floating drive connections are subject to excessive grinding actions due to these bending forces, which quickly wear the surfaces 36 and 40, away unless the thrust balls 37 are provided, and this feature forms an important part of the present invention since it relieves the device from excessive wear yet permits an offset rotation of the tool holder and tool.

Oftentimes the vertical axis of the work is so excessively angularly out of vertical alignment with the axis of the power drive that a full-floating flexible driving connection is desirable if not necessary. Such a full-floating driving connection is disclosed in my copending application, Serial No. 104,902, and is shown herein in Figs 11 to 16 inclusive, modified so as to include a thrust bearing between the contacting surfaces of the tool holder and hardened bearing ring in order to relieve the device from excessive if not destructive wear at this place.

The improved full-floating driving connection includes a power drive shank 120, having an integral threaded block 121 whose under concave spherical face 122, is provided with a semi-circular groove 123.

The block 121 is axially bored at 124, and radially bored at 125, (Fig. 13), three openings of two diameters each being provided at 120 degrees displacement.

A flexible driving connection is established between the rotatable shank 120, and the tool holder 126, through the medium of a semi-spherical drive member 127 which is provided with a semi-circular groove 128 in its upper spherical face, and which is also provided with a semi-cylindrical diametrical groove 129 in its lower plane face.

Drive balls 130, which run in the groove 123, transfer rotary movement from the rotatable shank 120, to the spherical faced cage 131, which in turn transfers rotary movement to the member 127 through the medium of the drive balls 132, which run in the groove 128, and are likewise engaged in the cage 131.

Rotary movement is then transferred from the drive member 127, through the medium of the upper drive balls 133, and lower drive balls 134 operating in radially disposed elongated through openings 135 and 136, respectively in the drive ball retainer disk 137.

The drive balls 133 run in the groove 129 for transferring rotary movement from the drive member 127 to the retainer disk 137, while the drive balls 134 run in the semi-cylindrical diametrical groove 138 located in the upper surface of the integral flanged disk 139 of the tool holder 126.

The under annular surface 140 of the disk 139 cooperates with thrust balls 141, maintained in spaced relation in the through openings 142, provided in the thrust ball retainer ring 143; and the thrust balls 141 run on the upper surface of the hardened raceway ring 144 whose under spherical surface 145 bears on the inner flanged spherical surface 146 of the housing sleeve 147.

The ball drive retainer disk 137 is provided with a series of through openings 137a, best shown in Fig. 14, in which are located a series of thrust rolling members such as balls 137b, which contact with the under surface of the drive member 127 and the upper plane surface of the disk 139 of the tool holder 126 for resisting the thrust loading due to the pressure exerted for forcing the rotating tool carried by the tool holder 126 downward into the work. This construction substantially relieves the drive balls 130, 132, 133 and 134 from any thrust loading so that they only operate to transfer rotary motion from the rotatable shank 120 through the medium of the cage 131 and retainer disk 137, to the tool carried by the tool holder 126.

The various parts are maintained in assembled relation, as shown in Figs. 10, 11 and 12, by the internally threaded housing sleeve 147 when it is secured in threaded engagement with the threaded block 121.

As best illustrated in Fig. 13, the centering stem 148 extending upward from the semi-spherical drive member 127, through the axial bore 124, is engaged by the three studs 149, tensioned by their respective springs 150, so as to normally maintain the member 127 in axial alignment with the shank 120.

Any suitable tool such as a tap 151, may be inserted in the tool holder 126, and held within the socket 152 thereof by means of the ball 153 and its coacting ring 154.

Thus the drive balls 130 and 132 cooperating between the grooves 123 and 128 and the cage 131 permit angular rotation of the tool such as shown at A or B in Fig. 16; while the drive balls 133 and 134 cooperating with the grooves 129 and 138 and the retainer disk 137 permit offset rotation of the tool as shown at B and C in Fig. 16. Incidentally, in the position shown at B in Fig. 16, the tool is rotated in both angular and laterally offset relation to the axis of the drive shank 120.

In the full floating type of flexible driving connection shown in Figs. 10 to 16, inclusive, the thrust loading due to the constant whipping to and fro of the tool holder 126 occasioned by the instantaneous bending set up because of the angularity and lateral shifting of the tool with respect to the axis of the shank, is taken care of by the thrust balls 141. Accordingly the full-floating driving connection does not encounter excessive wear at this place.

I claim:

1. In flexible driving connections for rotatable tools, a power drive member provided with a groove, a tool holder provided with a groove, anti-friction means interposed and coacting between the drive member and tool holder including a ball retainer disk provided with elongated radial openings, and balls in the openings running in the grooves for transferring rotary motion from the drive member to the tool holder as the axis of the tool holder shifts laterally to and fro, means for maintaining the drive member, tool holder, and coacting means in cooperative relation, and anti-friction means for resisting the thrust between the tool holder and maintaining means.

2. In flexible driving connections for rotatable tools, power drive means including a member having a lower plane face provided with a diametrical groove, a ball retainer disk provided with elongated radial openings, a tool holder having an upper plane face provided with a diametrical groove, drive balls located in certain of the openings contacting with the drive member groove, other drive balls located in other of said openings contacting with the tool holder groove, there being thrust ball openings in the disk, thrust balls located in the thrust ball openings and contacting with the drive member and tool holder plane faces, the tool holder having a lower annular bearing surface, a raceway ring below said bearing surface, anti-friction means interposed between said bearing surface and said ring, and a sleeve member cooperating with the drive member maintaining the drive member, ball retainer disk, drive balls, thrust balls, tool holder, raceway ring and anti-friction means in operative relation for transferring rotary movement from the drive member to the tool holder as the axis of the tool holder shifts laterally to and fro.

3. In flexible driving connections for rotatable tools, a power drive member having a concave spherical face provided with a groove, a semi-spherical member provided with a groove in its spherical face and a groove in its plane face, a tool holder provided with a groove, means coacting between the drive member, semi-spherical member, and tool holder including a ball retainer disk and drive balls between the drive member and spherical member and a ball retainer disk provided with elongated radial openings, and balls in the openings between the semi-spherical member and tool holder for transferring rotary motion from the drive member to the tool holder as the axis of the tool holder shifts laterally and angularly to and fro, means for maintaining the drive member, semi-spherical member, tool holder, and coacting means in cooperative relation, and anti-friction means for resisting the thrust between the tool holder and mantaining means.

4. In flexible driving connections for rotatable tools, a power drive member having a concave spherical face provided with a groove, a semispherical member having an upper convex spherical face provided with a groove, a ball cage between said spherical faces, drive balls located in the ball cage contacting with the drive member groove, other drive balls located in said cage contacting with the semi-spherical member groove, said semi-spherical member having a lower plane face provided with a diametrical groove, a ball retainer disk provided with elongated radial openings, a tool holder having an upper plane face provided with a diametrical groove, drive balls located in certain of the openings contacting with the semi-spherical member plane face groove, other drive balls located in other of said openings contacting with the tool holder groove, the tool holder having a lower annular bearing surface, a raceway ring below said bearing surface, anti-friction means interposed between said bearing surface and said ring, and a sleeve member cooperating with the drive member maintaining the drive member, cage, semi-spherical member, ball retainer disk, drive balls, tool holder, raceway ring and anti-friction means in operative relation for transferring rotary movement from the drive member to the tool holder as the axis of the tool holder shifts laterally and angularly to and fro.

5. In flexible driving connections for rotatable tools, a power drive member having a concave spherical face provided with a groove, a semi-spherical member having an upper convex spherical face provided with a groove, a ball cage between said spherical faces, drive balls located in the ball cage contacting with the drive member groove, other drive balls located in said cage contacting with the semi-spherical member groove, said semi-spherical member having a lower plane face provided with a diametrical groove, a ball retainer disk provided with elongated radial openings, a tool holder with elongated radial openings, a tool holder having an upper plane face provided with a diametrical groove. drive balls located in certain of the openings contacting with the semi-spherical member plane face groove, other drive balls located in other of said openings contacting with the tool holder groove, there being thrust ball openings in the disk, thrust balls located in the thrust ball openings and contacting with the semi-spherical member and tool holder plane faces, the tool holder having a lower annular bearing surface, a raceway ring below said bearing surface, anti-friction means interposed between said bearing surface and said ring, and a sleeve member cooperating with the drive member maintaining the drive member, cage, semi-spherical member, ball retainer disk, drive balls, tool holder, raceway ring and anti-friction means in operative relation for transferring rotary movement from the drive member to the tool holder as the axis of the tool holder shifts laterally and angularly to and fro.

6. In flexible driving connections for rotatable tools, power drive means including a member having a lower plane face provided with a diametrical groove, a ball retainer disk provided with elongated radial openings, a tool holder having an upper plane face provided with a diametrical groove, drive balls located in certain of the openings contacting with the drive member groove, other drive balls located in other of said openings contacting with the tool holder groove, the tool holder having a lower annular bearing surface, a raceway ring below said bearing surface, anti-friction means interposed between said bearing surface and said ring, and a sleeve member cooperating with the drive member maintaining the drive member, ball retainer disk, drive balls, tool holder, raceway ring and anti-friction means in operative relation for transferring rotary movement from the drive member to the tool holder as the axis of the tool holder shifts laterally to and fro.

In testimony that I claim the above, I have hereunto subscribed my name.

BERNARD P. SCHILTZ.